US012205429B2

(12) United States Patent
Kuenzi et al.

(10) Patent No.: US 12,205,429 B2
(45) Date of Patent: Jan. 21, 2025

(54) BIOMETRIC ENABLED ACCESS CONTROL

(71) Applicant: Carrier Corporation, Palm Beach Gardens, FL (US)

(72) Inventors: Adam Kuenzi, Silverton, OR (US); Yuri Novozhenets, Pittsford, NY (US); Andre Lalande, Tigard, OH (US); Mark H. Roach, Jupiter, FL (US); Rajeev Dubey, Highland Beach, FL (US); Chih-Kuang Lin, Dublin (IE); Devis Dishnica, Oakville, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/303,095

(22) Filed: May 20, 2021

(65) Prior Publication Data

US 2021/0390810 A1 Dec. 16, 2021

Related U.S. Application Data

(60) Provisional application No. 62/706,584, filed on Aug. 26, 2020, provisional application No. 62/705,105, filed on Jun. 11, 2020.

(51) Int. Cl.
*G07C 9/25* (2020.01)
*G07C 9/00* (2020.01)

(52) U.S. Cl.
CPC ......... *G07C 9/253* (2020.01); *G07C 9/00309* (2013.01)

(58) Field of Classification Search
None
See application file for complete search history.

(56) References Cited

U.S. PATENT DOCUMENTS 5,936,544 A 8/1999 Gonzales et al.
9,912,920 B2 3/2018 Chuter
10,255,737 B1 4/2019 Eichenblatt
(Continued)

FOREIGN PATENT DOCUMENTS

WO 2016025864 A1 2/2016
WO 2020113154 A1 6/2020

OTHER PUBLICATIONS

EP Application No. 21178025.9, Extended Search Report, Nov. 2, 2021, 9 pages.

*Primary Examiner* — Carlos Garcia

(74) *Attorney, Agent, or Firm* — Seager, Tufte & Wickhem, LLP

(57) ABSTRACT

An access control system and a method for operating an access control system are provided. The access control system includes a camera and an access control device and may additionally include a local processing device. At least one of the camera, the access control device, and the local processing device (when included) may be used to store a biometric identifier (e.g., in a storage medium) and compare an optical image with the biometric identifier (e.g., in an authentication module) to decide whether or not a mechanical or electronic lock should be unlocked. The camera, the access control device, and the local processing device (when included) are in short-range communication (e.g., to transmit the optical image and/or an authentication signal). The use of short-range communication allows the comparison of the optical image with the stored biometric identifier to be done locally instead of remotely (e.g., in a sever).

3 Claims, 4 Drawing Sheets

(56) References Cited

U.S. PATENT DOCUMENTS

| | | | | |
|---|---|---|---|---|
| 10,986,717 | B1 * | 4/2021 | Fu | H05B 47/11 |
| 2002/0186131 | A1 * | 12/2002 | Fettis | G08B 13/06 340/568.1 |
| 2004/0164848 | A1 * | 8/2004 | Hwang | H04L 63/0861 340/5.82 |
| 2006/0082437 | A1 * | 4/2006 | Yuhara | B60R 25/255 340/5.82 |
| 2006/0104483 | A1 * | 5/2006 | Harel | H04N 1/4406 340/5.82 |
| 2010/0052853 | A1 * | 3/2010 | Hilton | G06F 21/32 340/5.82 |
| 2016/0232763 | A1 | 8/2016 | Sockol | |
| 2016/0308859 | A1 | 10/2016 | Barry et al. | |
| 2017/0332055 | A1 | 11/2017 | Henderson | |
| 2018/0047227 | A1 | 2/2018 | Beavers et al. | |
| 2019/0202060 | A1 * | 7/2019 | Aaron | H04R 1/028 |
| 2019/0340904 | A1 | 11/2019 | Yuan | |

* cited by examiner

BIOMETRIC ENABLED ACCESS CONTROL

CROSS REFERENCE TO A RELATED APPLICATION

The application claims the benefit of U.S. Provisional Application No. 62/705,105 filed Jun. 11, 2020, and U.S. Provisional Application No. 62/706,584 filed Aug. 26, 2020 the contents of which are hereby incorporated in their entirety.

BACKGROUND

Access control devices (e.g., access control readers, lockboxes, and hotel locks) can be used to control various types of protected environments. Access control readers can be used to regulate the entry into and movement within a building. Lockboxes can be used to control the access to one or more items inside the lockbox (e.g., a key for a door to a home). Hotel locks can be used to limit access to a hotel room. To access the protected environment, authorized access credentials must be presented (e.g., to the access control device).

Conventionally, credentials have been presented to the access control devices using an RFID card, a FOB, a card with a magnetic stripe, and/or a mobile device. The decision of whether to grant access (e.g., by unlocking) is typically processed at a controller (e.g., located up to 4000 feet away from the access control device). For example, the controller may check a permissions database to ascertain whether there is a permission linked to the requestor's access credential. However, the conventional means of presenting credentials have the potential to be used by anyone (e.g., someone other than who they are intended to be used by). For example, in a hotel setting, a person may find a key card and may be able to access a room even though they are not the intended guest of the room. This may present a security issue both for the intended guest and for the hotel, as the person may remove or damage items within the room owned by either the intended guest or the hotel. Additionally, with conventional access control devices the identity of the person presenting the credentials is never captured, which may make it difficult to catch an intruder.

To ensure that access is not granted to an unintended person (e.g., an intruder) access control devices with biometric authentication have been deployed. Such devices verify the identity of a person based on a physiological or behavioral characteristic (e.g., by capturing an optical image of a biometric identifier, such as a fingerprint, a facial image, and/or an iris scan). These devices typically require connection to a network in order to match the presented biometric identifier with a stored, authorized biometric identifier. For example, the access control device may be capable of capturing the biometric identifier (e.g., by scanning a fingerprint, or taking a picture), but the processing of the biometric identifier (e.g., to see whether the biometric identifier matches an authorized biometric identifier) is typically done remotely (e.g., outside of the access control device, in a controller, which, as mentioned, may be located up to 4000 feet away from the access control device). One downside of using remote processing is the potential for delay in granting access. This delay may be caused by the time required for transmitting the signal(s) (e.g., between the access control device and the distant controller).

Accordingly, there remains a need for an access control system that is capable of capturing and locally processing biometric identifiers.

BRIEF DESCRIPTION

According to one embodiment an access control system with a camera and an access control device is provided. The camera includes an image sensor and a communication module. The image sensor is configured to capture an optical image. The communication module is configured to wirelessly transmit the optical image using a short-range communication. The access control device includes a communication module, a storage medium, and an authentication module. The communication module is configured to receive the optical image using the short-range communication. The storage medium is configured to store a biometric identifier. The authentication module is configured to compare the optical image with the biometric identifier. The authentication module is operatively connected to a lock actuator. The lock actuator is configured to lock or unlock a mechanical or electronic lock when the optical image is authenticated.

In accordance with additional or alternative embodiments, the biometric identifier is transmitted from at least one of an external device, a database, and a different access control device.

In accordance with additional or alternative embodiments, the authentication module is configured to add at least one biometric identifier to the storage medium.

In accordance with additional or alternative embodiments, the biometric identifier is added to the storage medium when paired with at least one of an authenticated optical image and an authorized access credential.

In accordance with additional or alternative embodiments a detection sensor operably connected to the image sensor is provided, the detection sensor is configured to initiate the capturing of the optical image when a door status event is detected.

In accordance with additional or alternative embodiments, the door status event includes at least one of: a vibration detection, a motion detection, a sound detection, an infrared detection, a rotation of a handle, and a presentation of an access credential.

In accordance with additional or alternative embodiments, the short-range communication includes at least one of: Bluetooth, Bluetooth Low Energy (BTLE), Zigbee, infrared, and Wi-Fi.

In accordance with additional or alternative embodiments, the camera is located, at least partially, within a peephole of a door.

In accordance with additional or alternative embodiments, at least one of the camera and the access control device are battery powered.

According to another aspect of the disclosure, an access control system including a camera and an access control device is provided. The camera includes an image sensor, a storage medium, an authentication module, and a communication module. The image sensor is configured to capture an optical image. The storage medium is configured to store a biometric identifier. The authentication module is configured to compare the optical image with the biometric identifier. The authentication module is configured to generate an authentication signal when the optical image is authenticated. The communication module is configured to wirelessly transmit the authentication signal using a short-range communication. The access control device includes a communication module and a lock actuator. The communication module is configured to receive the authentication signal using the short-range communication. The lock actuator is operatively connected to the communication module. The lock actuator is configured to lock or unlock a mechanical or electronic lock when the communication module receives the authentication signal.

In accordance with additional or alternative embodiments, the biometric identifier is transmitted from at least one of an external device, a database, and a different access control device.

In accordance with additional or alternative embodiments, the authentication module is configured to add at least one biometric identifier to the storage medium.

In accordance with additional or alternative embodiments, the biometric identifier is added to the storage medium when paired with at least one of an authenticated optical image and an authorized access credential.

In accordance with additional or alternative embodiments, a detection sensor operably connected to the image sensor is provided, the detection sensor is configured to initiate the capturing of the optical image when a door status event is detected.

In accordance with additional or alternative embodiments, the door status event includes at least one of: a vibration detection, a motion detection, a sound detection, an infrared detection, a rotation of a handle, and a presentation of an access credential.

In accordance with additional or alternative embodiments, the short-range communication includes at least one of: Bluetooth, Bluetooth Low Energy (BTLE), Zigbee, infrared, and Wi-Fi.

In accordance with additional or alternative embodiments, the camera is located, at least partially, within a peephole of a door.

In accordance with additional or alternative embodiments, at least one of the camera and the access control device are battery powered.

According to another aspect of the disclosure, an access control system including a camera, a local processing device, and an access control device is provided. The camera includes an image sensor and a communication module. The image sensor is configured to capture an optical image. The communication module is configured to wirelessly transmit the optical image using a short-range communication. The local processing device includes a communication module, a storage medium, and an authentication module. The communication module is configured to receive the optical image using the short-range communication. The storage medium is configured to store a biometric identifier. The authentication module is configured to compare the optical image with the biometric identifier. The authentication module is configured to generate an authentication signal when the optical image is authenticated. The access control device includes a communication module and a lock actuator. The communication module is configured to receive the authentication signal using the short-range communication. The lock actuator is operatively connected to the communication module. The lock actuator is configured to lock or unlock a mechanical or electronic lock when the communication module receives the authentication signal.

In accordance with additional or alternative embodiments, the biometric identifier is transmitted from at least one of an external device, a database, and a different access control device.

In accordance with additional or alternative embodiments, the authentication module is configured to add at least one biometric identifier to the storage medium.

In accordance with additional or alternative embodiments, the biometric identifier is added to the storage medium when paired with at least one of an authenticated optical image and an authorized access credential.

In accordance with additional or alternative embodiments, a detection sensor is operably connected to the image sensor, the detection sensor configured to initiate the capturing of the optical image when a door status event is detected.

In accordance with additional or alternative embodiments, the door status event includes at least one of: a vibration detection, a motion detection, a sound detection, an infrared detection, a rotation of a handle, and a presentation of an access credential.

In accordance with additional or alternative embodiments, the short-range communication includes at least one of: Bluetooth, Bluetooth Low Energy (BTLE), Zigbee, infrared, and Wi-Fi.

In accordance with additional or alternative embodiments, the local processing device is located, at least partially, behind a light switch.

In accordance with additional or alternative embodiments, at least one of the camera and the access control device are battery powered, and the local processing device is powered by a wired connection.

According to another aspect of the disclosure, a method for operating an access control system including a camera and an access control device is provided. The method includes a step for storing a biometric identifier in a storage medium, at least one of the camera, the access control device, and a local processing device including the storage medium. The method includes a step for capturing an optical image with an image sensor of the camera. The method includes a step for comparing, in an authentication module, the optical image with the biometric identifier, at least one of the camera, the access control device, and the local processing device including the authentication module, wherein a lock actuator is configured to unlock a mechanical or electronic lock when the optical image matches the biometric identifier.

In accordance with additional or alternative embodiments, the local processing device includes the storage medium and the authentication module.

In accordance with additional or alternative embodiments, the camera includes the storage medium and the authentication module.

In accordance with additional or alternative embodiments, the access control device includes the storage medium and the authentication module.

In accordance with additional or alternative embodiments, the method provides a step for transmitting the optical image to at least one of a network including at least two access control systems, and an external device.

In accordance with additional or alternative embodiments, the network is configured to generate a wandering intruder identifier when a pattern of repeated uses and/or failures is recognized.

In accordance with additional or alternative embodiments, the method provides a step for transmitting the wandering intruder identifier to at least one access control system within the network, the at least one access control system configured to use the wandering intruder identifier to deny access.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Figure 1:
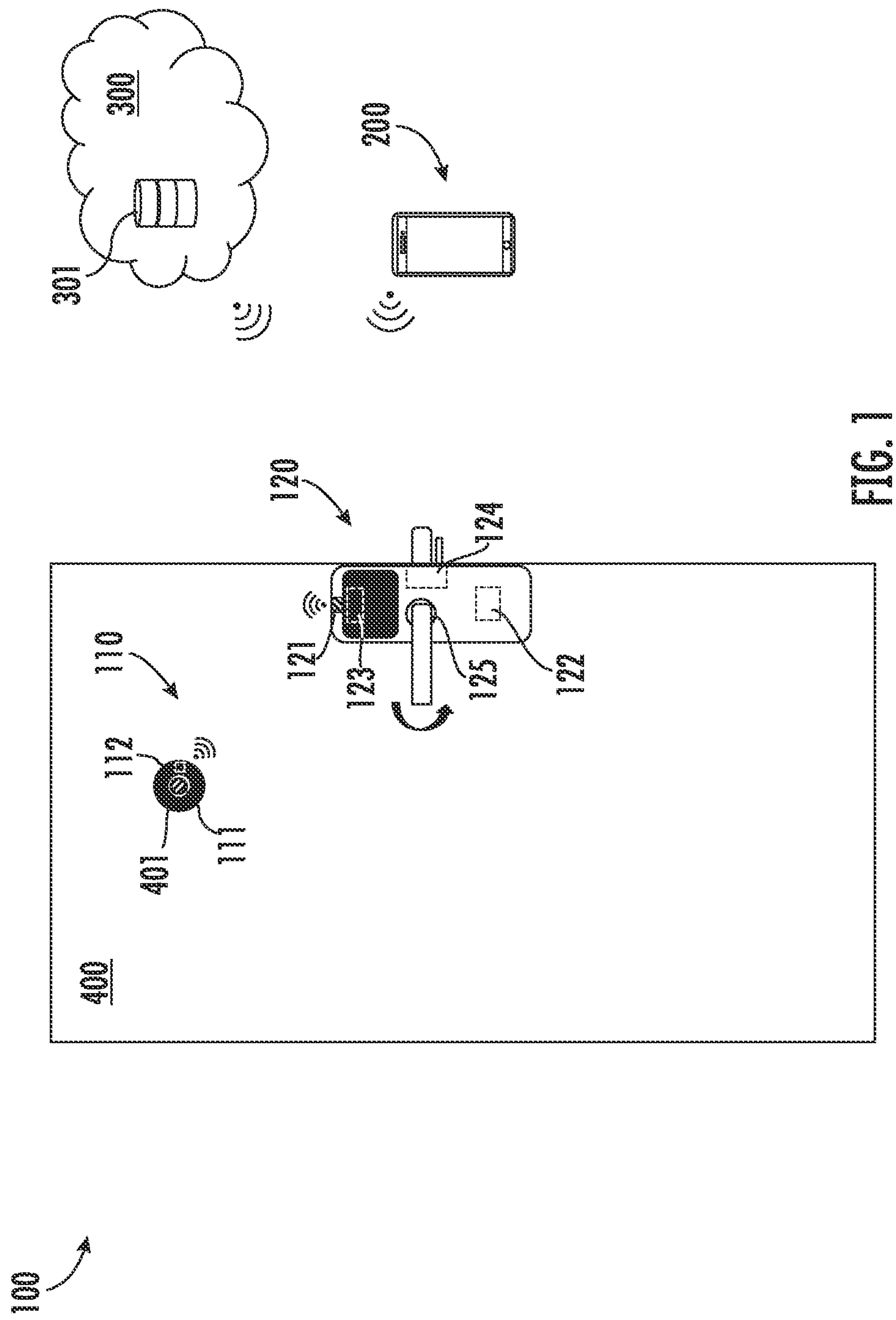
FIG. 1 is a schematic illustration of a first embodiment of an access control system with a camera and an access control device in accordance with one aspect of the disclosure.

Access control devices (e.g., access control readers, lockboxes, and hotel locks) may grant or deny access to a particular environment based on whether or not authorized credentials are received. The credentials may be transmitted with a separate item (e.g., an RFID card, a FOB, a card with a magnetic stripe, and/or a mobile device) or by presenting a biometric identifier (e.g., a fingerprint, face, and/or iris). When using a separate item, the credentials may be transmitted directly to the access control device. When presenting a biometric identifier, the credentials may be captured by a camera (e.g., by taking an optical image). It should be appreciated that the access control system described herein includes a camera and an access control device (in all embodiments), and a local processing device (in at least one embodiment). The camera, access control device, and the local processing device (when included) each are to be interpreted as separate pieces of hardware (e.g., not configured together). For example, the camera may be incorporated within a peephole of a door, the access control device may be incorporated within the door lock, and the local processing device may be incorporated inside the protected environment (e.g., behind a light switch).

Regardless of how presented, the credentials may be compared to the stored, authorized access credentials to see whether there is a permission linked to the requester's access credential. It is envisioned that the authorized access credentials are stored locally in a storage medium (e.g., in the camera, in the access control device, or in the local processing device (when included)). In certain instances, the authorized access credentials may have limited access rights. For example, particular access credentials may be associated with limited access rights that limit when the person is allowed access (or when they are not allowed access) depending on the time of day, etc. It should be appreciated that the authorized access credentials may be updated periodically. For example, the biometric identifiers may be updated (e.g., deleted and/or removed from the storage medium in the camera, in the access control device, or in the local processing device (when included)) when the access rights of a person expire (e.g., when the person should no longer have access to the particular environment). For example, when a guest checks out of a hotel their biometric identifier may be deleted/removed from the storage medium or may be switched from 'grant access' to 'deny access'. It should be appreciated that although described herein to be particularly useful in deciding when to grant access, in certain instances the capturing and processing of a biometric identifier may also be useful in deciding when to deny access.

Each access control device and/or local processing device (when included) may be connected to a controller, and each controller may be connected to a network (e.g., using a gateway, such as a router). The network may contain one or more databases maintained at a central server (e.g., which may be either on-site and/or cloud-based) and relevant parts (e.g., the updated list of authorized access credentials) of the databases may be downloaded to individual controllers. The controllers may communicate the authorized access credentials and any associated limitations or expirations of the authorized access credentials to the access control devices for storage and later processing (e.g., by an authentication module in the camera, the access control device, or the local processing device). In certain instances, individual access control devices and/or local processing devices (when included) may be connected directly to the network (e.g., without using a controller), and/or may receive authorized access credentials (e.g., which may be in the form of a stored biometric identifiers) and any associated limitations or expirations of the authorized access credentials from an external device (e.g., mobile device, computing device, mobile tablet, etc.) and/or a different access control device. For example, an authorized access credential may be added directly at an access control device by being paired with at least one of an authenticated optical image and an authorized access credential (e.g., transmitted with a separate item, such as an RFID card, a FOB, a card with a magnetic strip, and/or a mobile device), or indirectly by being added at a different access control device (described below). It is envisioned that by locally storing and processing the access credentials, the delay in granting access may be minimized (especially when the network connection is slow or has a long latency).

Figure 2:
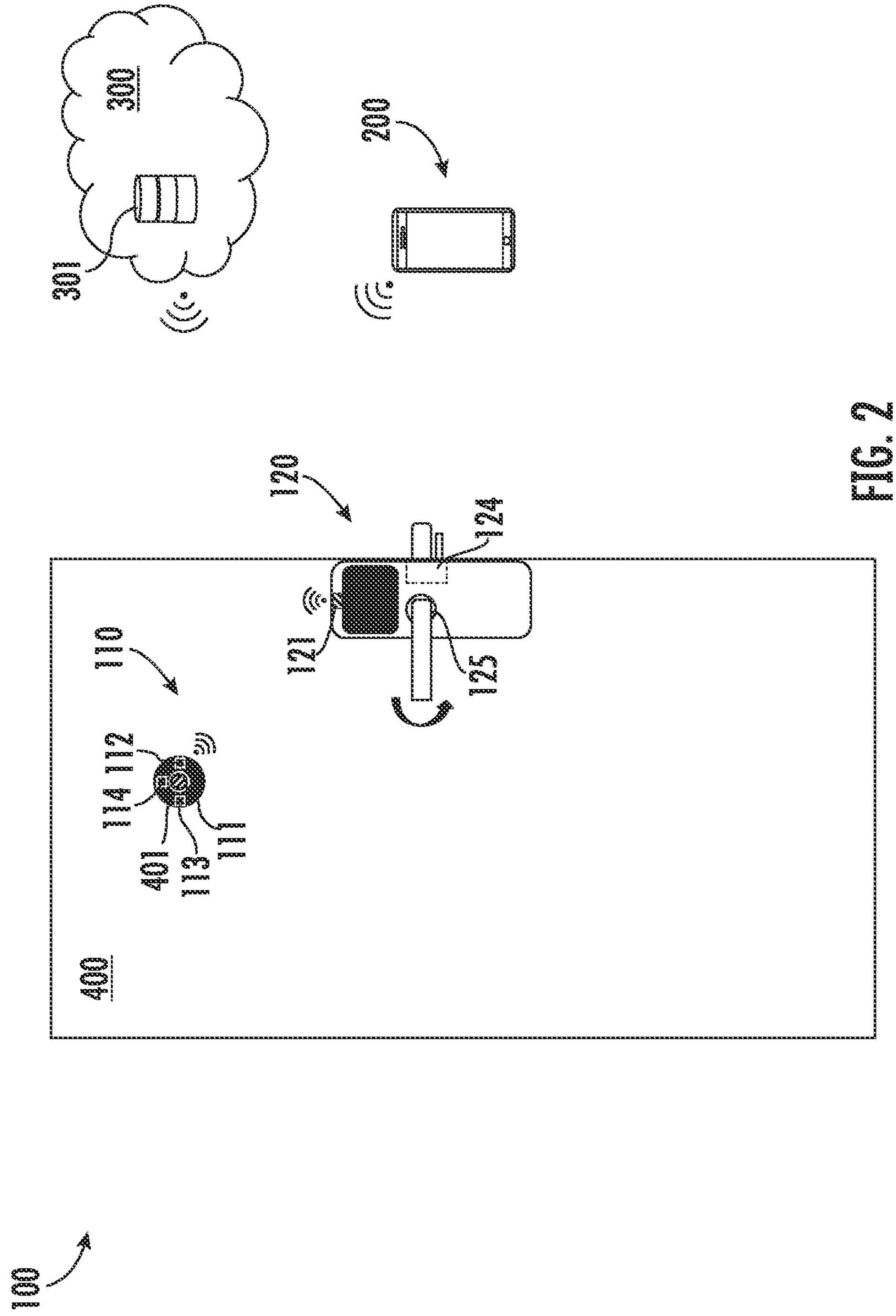
FIG. 2 is a schematic illustration of a second embodiment of an access control system with a camera and an access control device in accordance with one aspect of the disclosure.
Figure 3:
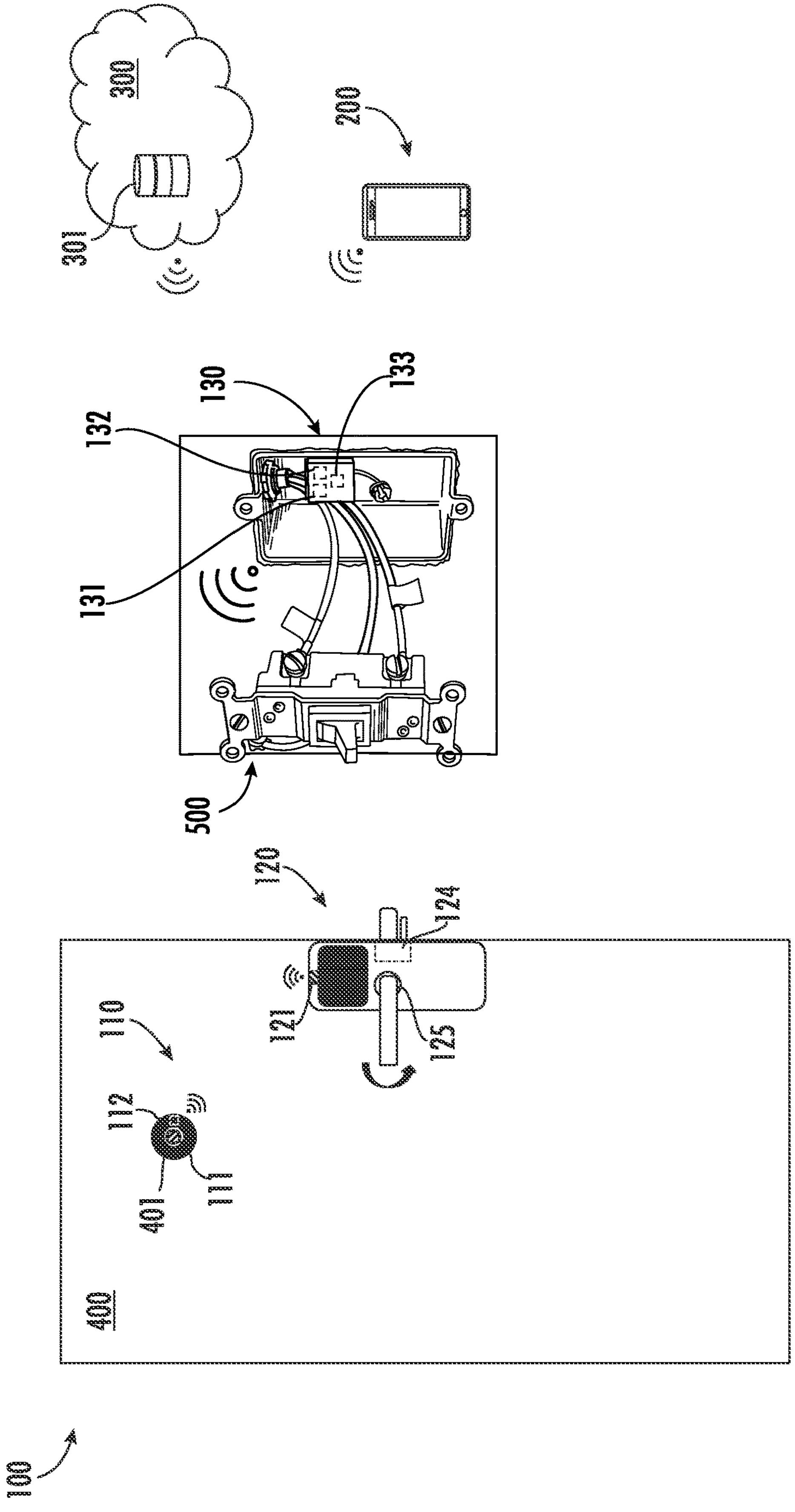
FIG. 3 is a schematic illustration of a third embodiment of an access control system with a camera, an access control device, and a local processing device in accordance with one aspect of the disclosure.

With reference now to the Figures, various schematic illustrations of an access control system 100 are shown in FIGS. 1-3. FIG. 1 illustrates a first embodiment of the access control system 100 where the storage and processing of the access credentials are completed in the access control device 120. FIG. 2 illustrates a second embodiment of the access control system 100 where the storage and processing of the access credentials are completed in the camera 110. FIG. 3 illustrates a third embodiment of the access control system 100 where the storage and processing of the access credentials are completed in the local processing device 130. Regardless of the embodiment, the access credentials are stored and processed locally (e.g., not processed by a controller, which may be located up to 4000 feet away from the access control device), which may help minimize any delay in granting access. In each embodiment, the access control system 100 includes a camera 110 and an access control device 120. In at least one embodiment, the access control system 100 further includes a local processing device 130. It should be appreciated that the local processing device 130 may, in certain instances, be any device within a short distance (e.g., less than ten feet) from the access control device 120 and the camera 110 that is capable of storing and processing access credentials. As mentioned above, the camera 110, the access control device 120, and the local processing device 130 are configured as separate pieces of hardware (e.g., not constructed as one unit).

As depicted in FIG. 1, where the access credentials are stored and processed in the access control device 120, the camera 110 may include an image sensor 111 and a communication module 112. The image sensor 111 may be configured to capture an optical image (e.g., of a face and/or an iris). The image sensor 111 may utilize any technology capable of detecting and conveying information regarding the optical image. For example, the image sensor 111 may convey the optical image as a wireless signal (e.g., through one or more wired or wireless connections) to the communication module 112. The communication module 112 may be configured to wirelessly transmit the optical image using a short-range communication (e.g., Bluetooth, Bluetooth Low Energy (BTLE), Zigbee, infrared, and Wi-Fi) or transmit the optical image over a wired communication (e.g. UART, Serial, Fiber-optic, SPI or Ethernet cable).

The access control device 120 may include a communication module 121, a storage medium 122, and an authentication module 123. The communication module 121 may be configured to receive the optical image from the communication module 112 of the camera 110 using the short-range and/or wired communication. The communication module 121 may be communicatively connected with the authentication module 123. The storage medium 122 may be configured to store a biometric identifier. The storage medium 122 may include, but it not limited to, any of the following: a hard disk, a random access memory (RAM), a read-only memory (ROM), an erasable programmable read-only memory (EPROM or Flash Memory), a static random access memory (SRAM), a portable compact disc read-only memory (CD-ROM), a digital versatile disk (DVD), a memory stick, and any suitable combination of the foregoing. The biometric identifiers stored in the storage medium 122 may be accessible by the authentication module 123.

The authentication module 123 may be configured to compare the optical image with the biometric identifier. The authentication module 123 may include a processor to enable the comparison of the optical image with the biometric identifier. The processor may be, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously. It should be appreciated that the authentication module 123 may also be capable of comparing access credentials received via conventional means (e.g., from an RFID card, a FOB, a card with a magnetic stripe, and/or a mobile device) with stored authorized access credentials (e.g., stored in the storage medium 122). The authentication module 123 may be operatively connected (e.g. through one or more wired or wireless connections) to a lock actuator 124. The lock actuator 124 may be configured to lock or unlock a mechanical or electronic lock when the access credentials are authenticated and not currently limited (e.g., not being used during a time of day where access rights not allowed). An optical image may be interpreted to be authenticated when the optical image captured by the camera matches a stored biometric identifier. Access credentials presented via conventional means may be interpreted to be authenticated when the presented access credential matches a stored authorized access credential.

The biometric identifiers and any associated limitations may be transmitted from at least one of an external device 200 (e.g., mobile device, computing device, mobile tablet, etc.), a database 301, or a different access control device (not shown) to the access control device 120 for storage and/or processing of optical images. In certain instances, the transmission of the biometric identifier to the access control device 120 may be prompted by a check-in (e.g., either at a front desk of a hotel through a computing device or through a mobile app on a guest's mobile device). The database 301, in certain instances, is housed in the network 300 (e.g., the same network 300 as the access control system 100). However, it is envisioned that the database 301, in certain instances, may be an external database (e.g., housed outside the network 300), such as CLEAR®. In certain instances, the biometric identifier may be transmitted to the access control device 120 for storage and/or processing by being input into a mobile app or webpage using an external device 200 connected to the network 300. For example, a guest of a hotel room may register one or more biometric identifiers in the mobile app, which may be transmitted and stored in the storage medium 122 (e.g., before the guest arrives at the hotel and/or the hotel room, or when the guest comes within Bluetooth range of the access control device 120). Additionally, it is envisioned that a guest's biometric identifier may be registered at the front desk (e.g., captured at the front desk and stored in the database 301), and may be transmitted to the access control device 120 before the guest arrives at the room. In certain instances, the biometric identifier may be on a separate item (e.g., on an RFID card) and transferred to the access control device 120. For example, a guest may use a kiosk to load their biometric identifier on the RFID card.

The biometric identifier may be added to the storage medium 122 by the authentication module 123. For example, a biometric identifier may be added to the storage medium 122 when paired with at least one of an authenticated optical image and an authorized access credential (e.g., which may be presented using conventional means such as an RFID card, a FOB, a card with a magnetic stripe, and/or a mobile device). It is envisioned that a person may register a biometric identifier with the access control system 100 at the access control device 120 by presenting a separate item (e.g., an RFID card, a FOB, a card with a magnetic stripe, and/or a mobile device) with linked permissions, or by presenting an optical image that matches a stored biometric identifier. For example, a primary guest whose biometric identifier (e.g., face and/or iris image) is already stored in the access control device 120 may be able to add a secondary guest's biometric identifier at the access control device 120.

The presentation of authorized access credentials with a mobile device (e.g., to enable the adding of a biometric identifier) may completed in a wireless close-range manner. For example, the authorized access credentials may only be transmitted (e.g., by the mobile device) and/or authenticated (e.g., by the authentication module 123 of the access control device 120), to allow the addition of a biometric identifier (e.g., at the access control device 120 by the authentication module 123) once the mobile device is within a close proximity (e.g., within a few feet) of the access control device 120. The proximity may be calculated using any suitable technology and/or method (e.g., time of flight, signal strength, etc.). This requirement of close proximity (when included) may help (i) reduce battery consumption and (ii) ensure that a fast and secure connection is created between the mobile device and the access control device 120, which may help both to reduce processing time and prevent someone other than the intended person (e.g., preventing intruders) from being able to add a biometric identifier.

For added security, the access control system 100 may further include the use of two-factor authentication (e.g., such as requiring a PIN code to be entered). It should be appreciated that this PIN code may be generated in the network 300 or the mobile device. For example, when a mobile device 100 (e.g., registered to a guest) enters the environment (e.g., the hotel) and connects to the network 300 (e.g., using Bluetooth, Wi-Fi, etc.), a PIN code may be sent to the access control device 120 and/or the mobile device (e.g., if the PIN code is generated in the network 300). Once the mobile device is within close proximity of the access control device 120 the PIN code may have to be entered (e.g., either in a mobile application on the mobile device or on the access control device 120) before the access control device 120 (e.g., the authentication module 123) allows a biometric identifier may be added. For example, the mobile device may not transmit the access credentials, and/or the authentication module 123 may not process or acknowledge that the access credentials are authorized until the PIN code is entered. It is envisioned that the entering of the PIN code may be time dependent (e.g., the user of the mobile device may have to enter the PIN code within a certain time interval of coming within a certain distance of the access control device 120). This requirement of another factor of authentication may add a layer of security so as to further ensure that only intended persons may be able to add biometric identifiers.

As mentioned above, the biometric identifier, once added, may be transferred from a different access control device (not shown) to the access control device 120. This may be particularly advantageous in situations where one environment (e.g., hotel room, etc.) has multiple access control devices 120, or where one user (e.g., hotel guest, etc.) may have access to multiple different environments that each have their own access control devices 120. For example, instead of requiring the guest to register their biometric identifier at the access control device 120 to their hotel room and the access control devices 120 for the shared spaces (e.g., the hotel pool or the gym), the access control system 100 described herein may allow registration to occur at only one access control device 120 (e.g., at the hotel room, pool, gym, etc.), which, once registered, is transmitted to other access control devices 120. It should be appreciated that the access control devices 120 may transmit biometric identifiers directly to one another (e.g., in a Bluetooth mesh configuration), or to the network 300, which then may transmit the biometric identifier to the access control devices 120. For example, the network 300 may store (e.g., in the database 301) which access control devices 120 should grant access to a given user (e.g., a particular guest) and transmit registered biometric identifiers accordingly.

In certain instances, the access control system 100 may be capable of capturing optical images when detecting door status events (e.g., vibration detection, motion detection, sound detection, infrared detection, rotation of a handle, and presentation of an access credential). This may help identify who accessed or tried to access the protected environment at any given time. For example, this may help identify an intruder who used a lost RFID card. To detect the door status events, the access control system 100 may include a detection sensor 125. This detection sensor 125 may be operably connected (e.g., through one or more wired or wireless connections) with the image sensor 111 (e.g., to initiate the capturing of the optical image when a door status event is detected). Although only depicting a detection sensor 125 on the access control device 120, it is envisioned that the detection sensor 125 may be located on the camera 110. It should be appreciated that the detection sensor 125 may include any technology (e.g., a passive infrared sensor, a radar motion sensor, and/or a capacitive sensor) capable of capturing door status events. For example, the detection sensor 125 may be capable of capturing at least one of the following: vibrations associated a knock of the door 400, vibrations associated with the insertion of a key, movement associated with the opening or closing of the door 400, rotation of the handle, sound in proximity to the door 400, and heat caused by the presence of person or a fire in proximity to the door 400.

As depicted in FIG. 2, where the access credentials are stored and processed in the camera 110, the camera 110 may include an image sensor 111, a communication module 112, a storage medium 113, and an authentication module 114. The image sensor 111 may be configured to capture an optical image (e.g., of a face and/or an iris). The image sensor 111 may utilize any technology capable of detecting and conveying information regarding the optical image. For example, the image sensor 111 may convey the optical image as a wireless signal (e.g., through one or more wired or wireless connections) to the authentication module 114. The storage medium 113 may be configured to store a biometric identifier. The storage medium 113 may include, but it not limited to, any of the following: a hard disk, a random access memory (RAM), a read-only memory (ROM), an erasable programmable read-only memory (EPROM or Flash Memory), a static random access memory (SRAM), a portable compact disc read-only memory (CD-ROM), a digital versatile disk (DVD), a memory stick, and any suitable combination of the foregoing. The biometric identifiers stored in the storage medium 113 may be accessible by the authentication module 114.

The authentication module 114 may be configured to compare the optical image with the biometric identifier. The authentication module 114 may include a processor to enable the comparison of the optical image with the biometric identifier. The processor may be, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously. The authentication module 114 may generate an authentication signal when the optical image is authenticated and not currently limited (e.g., not being used during a time of day where access rights not allowed). The communication module 112 may be configured to wirelessly transmit the authentication signal using a short-range communication (e.g., Bluetooth, Bluetooth Low Energy (BTLE), Zigbee, infrared, and Wi-Fi) or transmit the authentication signal over a wired communication (e.g. UART, Serial, Fiber-optic, SPI or Ethernet cable).

The access control device 120 may include a communication module 121 and a lock actuator 124. The communication module 121 may be configured to receive the authentication signal using the short-range and/or wired communication. The communication module 121 may be operatively connected (e.g., through one or more wired or wireless connections) to a lock actuator 124. The lock actuator 124 may be configured to lock or unlock a mechanical or electronic lock when the communication module 121 receives the authentication signal.

The biometric identifiers may be transmitted from at least one of an external device 200 (e.g., mobile device, computing device, mobile tablet, etc.), a database 301, and a different access control device (not shown) to the camera 110 for storage and/or processing of optical images. To ensure that each biometric identifier is transmitted to the correct camera 110 (e.g., associated with a particular access control device 120), each camera 110 may be linked with an access control device 120. For example, the camera 110 and the access control device 120 each may be given unique device identifiers (e.g., to enable the camera 110 and the access control device 120 to know and trust one another). Each unique device identifier may consist of a unique numeric or alphanumeric code, and may be stored in the database 301 (e.g., the database 301 may store which particular unique device identifier, associated with a particular camera 110, is linked with which other particular unique device identifier, associated with a particular access control device 120). It is envisioned that at least a portion of a unique device identifier may be transmitted with the biometric identifier (e.g., the camera 110 may receive a portion of its own unique device identifier or a portion of a unique device identifier of a particular access control device 120 when receiving a biometric identifier). It should be appreciated that at least portion of a unique device identifier may be transmitted between the access control device 120 and the camera 110 when communicating. For example, the camera 110 may transmit at least a portion of its own unique device identifier or at least a portion of an access control device's 120 unique device identifier to the access control device 120 when transmitting information (e.g., a biometric identifier and/or an optical image). In certain instances, the transmission of the biometric identifier to the camera 110 may be prompted by a check-in (e.g., either at a front desk of a hotel through a computing device or through a mobile app on a mobile device).

The database 301, in certain instances, is housed in the network 300 (e.g., the same network 300 as the access control system 100). However, it is envisioned that the database 301, in certain instances, may be an external database (e.g., housed outside the network 300), such as CLEAR®. In certain instances, the biometric identifier may be transmitted to the camera 110 for storage and/or processing by being input into a mobile app or webpage using an external device 200 connected to the network 300. For example, a guest of a hotel room may register one or more biometric identifiers in the mobile app, which may be transmitted and stored in the storage medium 113 (e.g., before the guest arrives at the hotel and/or the hotel room, or when the guest comes within Bluetooth range of the access control device 120). Additionally, it is envisioned that a guest's biometric identifier may be registered at the front desk (e.g., captured at the front desk and stored in the database 301), and may be transmitted to the camera 110 (e.g., linked with a particular access control device 120 of a particular room) before the guest arrives at the room.

The biometric identifier may be added to the storage medium 113 by the authentication module 114. For example, a biometric identifier may be added to the storage medium 113 when paired with at least one of an authenticated optical image and an authorized access credential (e.g., which may be presented to the access control device 120 using conventional means such as an RFID card, a FOB, a card with a magnetic stripe, and/or a mobile device). It is envisioned that a person may register a biometric identifier with the access control system 100 at the camera 110 either (i) by presenting a separate item (e.g., an RFID card, a FOB, a card with a magnetic stripe, and/or a mobile device) with linked permissions (e.g., to the access control device 120), (ii) or by presenting an optical image that matches a stored biometric identifier (e.g., to the camera 110). For example, a primary guest whose biometric identifier (e.g., face and/or iris image) is already stored in the camera 110 may be able to add a secondary guest at the camera 110. It should be appreciated that, as with the first embodiment (shown in FIG. 1), this embodiment (shown in FIG. 2) may be capable of capturing optical images when detecting door status events (e.g., vibration detection, motion detection, sound detection, infrared detection, rotation of a handle, and presentation of an access credential). These optical images may be stored in the storage medium 113 of the camera 110.

At least one of the camera 110 and the access control device 120 may be battery powered. To increase the life of the battery, it may be advantageous to offload the storage and/or processing of the access credentials to a separate device (e.g., a local processing device 130), which may be powered by a wired connection. For example, as shown in FIG. 3, the access credentials may be stored and processed in a local processing device 130 (e.g., located, at least partially, behind a light switch 500 within the protected environment). Although shown behind a light switch 500, it is envisioned that the local processing device 130 may be located anywhere where wired power is available (e.g., behind a light (not shown), or behind a key card switch (not shown)). A key card switch (not shown) is a device commonly used in Europe and Latin America to reduce energy consumption in a hotel room (e.g., by limiting the powering of the electronics within the room to only when a key card is placed within the key card switch).

This placement of the local processing device 130 may provide benefits both in terms of added security and better communications. For example, by placing the local processing device 130 (which is storing and processing the biometric identifiers) within the protected environment (e.g., within the wall/ceiling, inside the room, behind the locked door 400 to the protected environment) it may be harder to break into the protected environment (as an attempted intruder may not be able to physically tamper with the local processing device 130). Additionally, with the light switch 500 typically being within a few feet of the door 400 (where the camera 110 and the access control device 120 may be positioned), there should be little to no delay in transmitting data between the local processing device 130 and the camera 110 or between the local processing device 130 and the access control device 120. It should be appreciated that the wired power connection may also result in a better (e.g., stronger) signal being emitted from the local processing device 130, which may allow better communication to the network 300, the external device 200, and/or within the access control system 100.

As shown in FIG. 3, when including a local processing device 130, the camera 110 may include an image sensor 111, and a communication module 112. The image sensor 111 may be configured to capture an optical image (e.g., of a face and/or an iris). The image sensor 111 may utilize any technology capable of detecting and conveying information regarding the optical image. The communication module 112 may be configured to wirelessly transmit the optical image (e.g., as a wireless signal) using a short-range communication (e.g., such as Bluetooth, Bluetooth Low Energy (BTLE), Zigbee, infrared, and/or Wi-Fi) to the local processing device 130. The local processing device 130 may include a communication module 131, a storage medium 132, and an authentication module 133. The communication module 131 is configured to receive the optical image using the short-range communication (e.g., from the communication module 112 of the camera 110). The storage medium 132 is configured to store a biometric identifier (e.g., received from at least one of an external device 200 and a database 301).

The storage medium 132 may include, but it not limited to, any of the following: a hard disk, a random access memory (RAM), a read-only memory (ROM), an erasable programmable read-only memory (EPROM or Flash Memory), a static random access memory (SRAM), a portable compact disc read-only memory (CD-ROM), a digital versatile disk (DVD), a memory stick, and any suitable combination of the foregoing. The biometric identifiers stored in the storage medium 132 may be accessible by the authentication module 133. The authentication module 133 may be configured to compare the optical image with the stored biometric identifiers. The authentication module 133 may include a processor to enable the comparison of the optical image with the biometric identifier. The processor may be, but is not limited to, a single-processor or multi-processor system of any of a wide array of possible architectures, including field programmable gate array (FPGA), a central processing unit (CPU), application specific integrated circuits (ASIC), digital signal processor (DSP) or graphics processing unit (GPU) hardware arranged homogenously or heterogeneously. The authentication module 133 may generate an authentication signal when the optical image is authenticated and not currently limited (e.g., not being used during a time of day where access rights not allowed). The communication module 131 may be configured to wirelessly transmit the authentication signal using a short-range communication (e.g., Bluetooth, Bluetooth Low Energy (BTLE), Zigbee, infrared, and Wi-Fi) or transmit the authentication signal over a wired communication (e.g. UART, Serial, Fiber-optic, SPI or Ethernet cable) to the access control device 120.

The access control device 120 may include a communication module 121 and a lock actuator 124. The communication module 121 may be configured to receive the authentication signal (e.g., from the communication module 131 of the local processing device 130) using the short-range and/or wired communication. The communication module 121 may be operatively connected (e.g., through one or more wired or wireless connections) to a lock actuator 124. The lock actuator 124 may be configured to lock or unlock a mechanical or electronic lock when the communication module 121 receives the authentication signal.

Although depicted in FIG. 3 to have a one-to-one ratio of local processing device 130 to access control system 100 (e.g., each of which include a camera 110 and an access control device 120), it is envisioned that each local processing device 130 may be connected to numerous (e.g., two or more) access control systems 100 (e.g., each of which include a camera 110 and an access control device 120). To ensure that the data (e.g., the optical image and the authentication signal) remains organized (e.g., associated with and transmitted to/from the correct access control system 100), each local processing device 130 may be configured to receive at least a portion of a unique device identifier (e.g., which may identify the particular access control system 100, camera 110, and/or access control device 120 of which the data is associated with) when receiving the optical image (e.g., from the camera 110) and/or the biometric identifier. At least a portion of this unique device identifier may be transmitted from the local processing device 130 when transmitting the authentication signal to the access control device 120. This may enable the access control device 120 to trust the authentication signal. As described above, the unique device identifier(s) may be stored in the database 301 (e.g., housed in the same network 300 as the access control system 100).

It should be appreciated that the biometric identifier may be sourced from an external database (e.g., housed outside the network 300), such as CLEAR®, or may be transmitted to the local processing device 130 for storage and/or processing by being input into a mobile app or webpage using an external device 200 connected to the network 300. For example, a guest of a hotel room may register one or more biometric identifiers in the mobile app, which may be transmitted to the communication module 131 and stored in the storage medium 132 (e.g., before the guest arrives at the hotel and/or the hotel room, or when the guest comes within Bluetooth range of the local processing device 130). Additionally, it is envisioned that a guest's biometric identifier may be registered at the front desk (e.g., captured at the front desk and stored in the database 301), and may be transmitted to the communication module 131 of the local processing device 130 (e.g., associated with a particular access control system 100 of a particular room) before the guest arrives at the room.

As with authentication modules 114, 123 in the above-described embodiments, the authentication module 133 in this embodiment may be configured to add biometric identifiers to the storage medium 132. For example, a biometric identifier may be added to the storage medium 132 when paired with at least one of an authenticated optical image and an authorized access credential (e.g., which may be presented to the access control device 120 using conventional means such as an RFID card, a FOB, a card with a magnetic stripe, and/or a mobile device). It is envisioned that a person may register a biometric identifier with the access control system 100 at the camera 110 either (i) by presenting a separate item (e.g., an RFID card, a FOB, a card with a magnetic stripe, and/or a mobile device) with linked permissions (e.g., to the access control device 120), (ii) or by presenting an optical image that matches a stored biometric identifier (e.g., to the camera 110). For example, a primary guest whose biometric identifier (e.g., face and/or iris image) is already stored in the camera 110 may be able to add a secondary guest at the camera 110.

It should be appreciated that, as with the first embodiment (shown in FIG. 1) and the second embodiment (shown in FIG. 2), this embodiment (shown in FIG. 3) may be capable of capturing optical images when detecting door status events (e.g., vibration detection, motion detection, sound detection, infrared detection, rotation of a handle, and presentation of an access credential). For example, detection sensor 125 (e.g., a passive infrared sensor, a radar motion sensor, and/or a capacitive sensor) may be operably connected (e.g., through one or more wired or wireless connections) with the image sensor 111 (e.g., to initiate the capturing of the optical image when a door status event is detected). To ensure that the captured optical image is capable of being processed (e.g., by the local processing device 130) it may be advantageous (e.g., in one or more of the embodiments described) to put a visual indicator (not shown) on or near the camera 110.

This visual indicator (not shown) may cause a behavioral change (e.g., causing the person who caused the door status event to look at the camera 110), which may optimize the ability of the camera 110 to take an optical image that is capable of being processed. It is envisioned that the visual indicator may be in the form of a light (e.g., an LED). For example, the light may blink at or near the camera 110 when the detection sensor 125 detects a door status event. It should be appreciated that the visual indicator may serve an additional purpose of providing feedback to the user. For example, the light may blink in a certain pattern or be of a certain color when capturing the optical image, and switch to a different pattern or different color when the captured optical image is being processed. If the optical image is not able to be processed successfully (e.g., if unable to match with the stored biometric identifier), then the visual indicator may switch back to the pattern/color that indicates another optical image is being captured, which may let the user know that they need to look at the camera 110 to capture another optical image. It is envisioned that by providing feedback in this manner the user may feel more connected and informed and be willing to tolerate a longer latency period (e.g., caused by the processing of the optical image) than may otherwise be tolerated without feedback.

As mentioned above, in each of the above-described embodiments, the access control system 100 may, in certain instances, rely on one or more battery to power at least one of the camera 110 and the access control device 120. When included (e.g., in the third embodiment, as shown in FIG. 3), the local processing device 130 may be powered by a wired connection. When relying on battery power it may be advantageous for at least one of the camera 110 and the access control device 120 to "sleep" when not being used (e.g., if not used for a predefined time). When one of the components (e.g., either the camera 110 or the access control device 120) are configured to "sleep", the communication modules 112, 121, 131 may be used to "wake-up" the sleeping component(s). For example, if the camera 110 is configured to sleep, the communication module 121 of the access control device 120 may transmit a "wake-up" signal to the communication module 112 of the camera 110. Conversely, if the access control device 120 is configured to sleep, the communication module 112 of the camera 110 may transmit a "wake-up" signal to the communication module 121 of the access control device 120. Additionally, if the camera 110 and the access control device 120 are configured to sleep, the communication module 131 of the local processing device 130 may transmit a "wake-up" signal to the communication modules 112, 121 of both the camera 110 and the access control device 120. In each instance, the "wake-up" signal may be transmitted using a short-range communication (e.g., Bluetooth, Bluetooth Low Energy (BTLE), Zigbee, infrared, and Wi-Fi) or over a wired communication (e.g. UART, Serial, Fiber-optic, SPI or Ethernet cable). The prompting of the "wake-up" signal may, in certain instances, be caused by a detection of a door status event by the detection sensor 125 (e.g., which may be configured to remain powered). It should be appreciated that in certain instances both the access control device 120 and the camera 110 are always on (e.g., meaning that neither are configured to "sleep").

As described above, the camera 110, the access control device 120, and the local processing device 130 (when included) are configured as separate components (e.g., independent pieces of hardware) of the access control system 100. By configuring the camera 110, the access control device 120, and the local processing device 130 separately, the access control system 100 may allow for a tiered access control system 100. For example, instead of requiring an entire new system to be installed, at least one of the embodiments of the access control system 100 described herein may be capable of being implemented alongside existing systems by installing the camera 110 within the peephole 401 of the door 400, and configuring the existing access control device 120 to be capable of operating based on input (e.g., unlocking when receiving authentication signals) from the camera 110 and/or the local processing device 130. This may provide added flexibility and reduced cost for the customer (e.g., the hotel, hospital, office building, etc.).

Although described above to be useful in a hotel setting, it should be appreciated that the access control system 100 described herein may be useful in a variety of different settings. For example, the access control system 100 may be useful in any type of environment where access needs to be verified and/or recorded. In certain instances, the access control system 100 may be useful to ensure accuracy of records for who accessed a particular environment at a given time (e.g., who pulled medicine in a hospital setting, who accessed a hotel room at a given time, who requested the elevator at a given time). Additionally, when connected to a network 300, the access control system 100 may be capable of identifying a wandering intruder and be able to restrict access based on the stored biometric identifier. For example, the access control system 100 may be capable of generating a wandering intruder identifier, which may be in the form of a biometric identifier that, instead of being used to grant access, is used to deny access.

Figure 4:
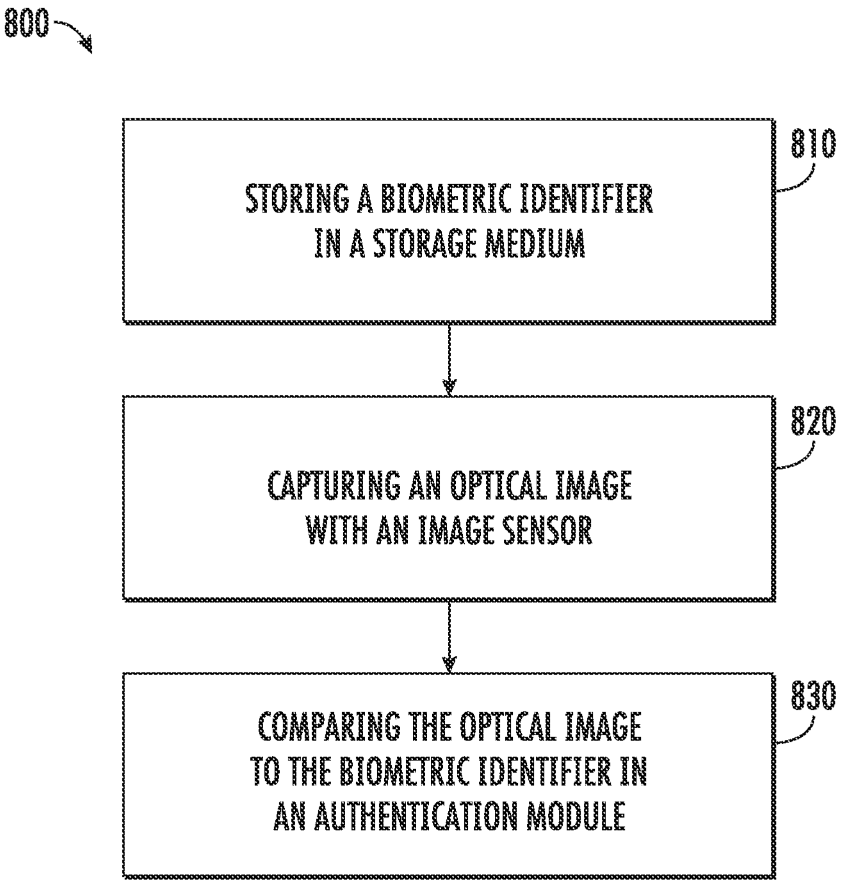
FIG. 4 is a flow diagram illustrating a method of operating an access control system including a camera and an access control device in accordance with one aspect of the disclosure.

An exemplary method 800 of operating an access control system 100 is illustrated in FIG. 4. The method 800 may be performed, for example, using any of the exemplary access control systems 100 shown in FIGS. 1-3, which include a camera 110 and an access control device 120 (in all embodiments), and a local processing device 130 (in at least one embodiment). The method 800 includes step 810 for storing a biometric identifier in a storage medium (e.g., which may be in the camera 110, the access control device 120, or the local processing device 130 (when included)). The method 800 includes step 820 for capturing an optical image with an image sensor 111 of the camera. As described above, the capturing of the optical image with an image sensor 111 may be initiated by the detection of a door status event with the detection sensor 125. The method 800 includes step 830 for comparing, in an authentication module (e.g., which may be in the camera 110, the access control device 120, or the local processing device 130 (when included)), the optical image with the biometric identifier.

The method 800 may provide for the transmitting of the optical image to at least one of a network 300 and an external device 200. In certain instances, additional information such as the event type (e.g., a failure of opening or a successful opening), the time the event occurred, and/or an identifier (e.g., a name associated with a given access credential, as opposed to an optical image) may be transmitted (either alone or with the optical image) to at least one of the network 300 and the external device 200. It is envisioned that the optical image and/or the additional information may be stored as a record in the database 301 (e.g., housed in the network 300), and may be accessible for later use. For example, the record may make it possible to identify who attempted to or gained access to a particular protected environment at a given time. This information may also be able to help prevent future intrusions.

It should be appreciated that each access control system 100 may be connected to a network 300. The network 300 may include at least two access control systems 100. The network 300 may be configured to generate a wandering intruder identifier (e.g., a biometric identifier to be blocked). This wandering intruder identifier may be generated by the network 300 following the repeated use and/or failure of an access credential at one or more access control systems 100. For example, an access control system 100 may communicate a failed access attempt to the network 300. The network 300 may be configured to recognize a pattern of repeated uses and/or failures and generate a wandering intruder identifier. It should be appreciated that a pattern of repeated uses and/or failures may be recognized when the same access credentials are denied by two or more access control systems 100. The wandering intruder identifier may be transmitted to at least one access control system 100 within the network 300. In certain instances, the network 300 may be configured to transmit the wandering intruder identifier to all of the access control systems 100 within the network 300. As mentioned above, this may allow the access control system 100 to deny access when a captured optical image matches a wandering intruder identifier.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for operating an access control system comprising a camera and an access control device, the method comprising:

storing a biometric identifier in a storage medium of the camera;

capturing an optical image with an image sensor of the camera;

comparing, in an authentication module of the camera, the optical image with the biometric identifier;

transmitting the optical image to a network comprising at least two access control systems, wherein the network is configured to generate a wandering intruder identifier when a pattern of repeated failures to access is recognized, wherein the pattern of repeated failures to access is recognized when the same access credentials are denied by the at least two access control systems;

wherein the wandering intruder identifier indicates a biometric identifier to be blocked, and wherein the method further comprises denying access based on the wandering intruder identifier.

2. A security network comprising:

at least two access control systems, each access control system comprising a camera having an image sensor and a storage medium, and an access control device having a lock actuator for actuating a mechanical lock or an electrical lock, each access control system configured to:

store a biometric identifier in a storage medium of the camera;

capture an optical image with an image sensor of the camera;

compare, in an authentication module of the camera, the optical image with the biometric identifier to either authenticate or deny the optical image;

transmit the optical image to a database of the network;

wherein the network is configured to generate a wandering intruder identifier when a pattern of repeated failures to access is recognized, wherein the pattern of repeated failures to access is recognized when the same access credentials are denied by the at least two access control systems;

wherein the wandering intruder identifier indicates a biometric identifier to be blocked, and each access control system is configured to deny access based on the wandering intruder identifier.

3. The network of claim 2, wherein each access control system is further configured to:

generate, with the authentication module of the camera, an authentication signal when the optical image is authenticated;

transmit the authentication signal from the camera to the access control device;

receive the authentication signal at the access control device;

unlock, with the lock actuator, the mechanical lock or the electronic lock when the authentication signal is received from the camera.

* * * * *